US006925437B2

(12) United States Patent
Hayashi

(10) Patent No.: US 6,925,437 B2
(45) Date of Patent: Aug. 2, 2005

(54) ELECTRONIC MAIL DEVICE AND SYSTEM

(75) Inventor: Kiyoko Hayashi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 450 days.

(21) Appl. No.: 09/873,275

(22) Filed: Jun. 5, 2001

(65) Prior Publication Data

US 2002/0026316 A1 Feb. 28, 2002

(30) Foreign Application Priority Data

Aug. 28, 2000 (JP) .......................................... 2000-256812
Apr. 27, 2001 (JP) .......................................... 2001-131203

(51) Int. Cl.$^7$ ............................................. G01L 13/08
(52) U.S. Cl. ....................... 704/260; 704/258; 709/206
(58) Field of Search ................................ 704/258, 260, 704/270, 201; 709/206

(56) References Cited

U.S. PATENT DOCUMENTS

| | | | | |
|---|---|---|---|---|
| 5,278,943 A | * | 1/1994 | Gasper et al. ............... | 704/200 |
| 5,875,427 A | * | 2/1999 | Yamazaki .................... | 704/258 |
| 6,289,085 B1 | * | 9/2001 | Miyashita et al. ........ | 379/88.02 |
| 6,411,931 B1 | * | 6/2002 | Yamada ....................... | 704/260 |
| 6,477,494 B2 | * | 11/2002 | Hyde-Thomson et al. .. | 704/260 |
| 6,574,598 B1 | * | 6/2003 | Nakatsuyama et al. ..... | 704/260 |

FOREIGN PATENT DOCUMENTS

JP            4175049            6/1992

OTHER PUBLICATIONS

USPTO Translation of Saito—JP 04–175049, Jul. 2004.*

* cited by examiner

*Primary Examiner*—David L. Ometz
*Assistant Examiner*—James S. Wozniak
(74) *Attorney, Agent, or Firm*—Birch, Stewart, Kolasch & Birch, LLP

(57) ABSTRACT

An amount of character setting information inserted in a mail text is minimized. A character is selected from a list and a given text letter string of the inputted information is inserted in the mail text. Simultaneously, detailed character setting information is read from a character setting information portion and each setting element of the specified character is stored in a detailed character setting information storing work portion. The detailed data is automatically read from the work portion and attached as a formatted text letter string to the end of the mail text to be transmitted. When the mail arrives, the detailed data is separated from the mail text and stored in the work portion. In reproduction of the mail text, the device recognizes character setting information in the text, reads the detailed character setting information from the work portion and vocally reproduces the text based on the detailed data.

11 Claims, 13 Drawing Sheets

FIG. 8

<CHARACTER SETTING INFORMATION>

| WOMAN'S VOICE | FEMALE VOICE, HEIGHT 1, DEEPNESS 3, SPEED 2, ⋯ |
|---|---|
| OLD WOMAN'S VOICE | FEMALE VOICE, HEIGHT 0, DEEPNESS 1, SPEED 1, ⋯ |
| OLD MAN'S VOICE | MALE VOICE, HEIGHT 0, DEEPNESS 1, SPEED 2, ⋯ |
| BABY'S VOICE | FEMALE VOICE, HEIGHT 4, DEEPNESS 3, SPEED 1, ⋯ |
| ROBOT'S VOICE | MALE VOICE, HEIGHT 3, DEEPNESS 2, SPEED 1, ⋯ |
| ALIEN'S VOICE | FEMALE VOICE, HEIGHT 5, DEEPNESS 1, SPEED 3, ⋯ |
| ⋯ | |

FIG. 9

<MAIL TEXT>

[WOMAN'S VOICE] A SUDDEN MEETIMG WILL BE HELD AT 17:00 TODAY.
[ROBOT'S VOICE] COULD YOU MAKE TIME TO ATTEND THE MEETING?
[ALIEN'S VOICE] PLEASE GIVE ME A RING IF YOU HAVE NO TIME.
SEE YOU LATER.

CHARACTER SETTING INFORMATION : [WOMAN'S VOICE],
[ROBOT'S VOICE], [ALIEN'S VOICE]

<DETAILED CHARACTER SETTING INFORMATION STORING WORK PORTION>

| WOMAN'S VOICE | FEMALE VOICE, HEIGHT 1, DEEPNESS 3, SPEED 2, ··· |
|---|---|
| ROBOT'S VOICE | MALE VOICE, HEIGHT 3, DEEPNESS 2, SPEED 1, ··· |
| ALIEN'S VOICE | FEMALE VOICE, HEIGHT 5, DEEPNESS 1, SPEED 3, ··· |

FIG. 11

\<MAIL TEXT\>

[WOMAN'S VOICE] A SUDDEN MEETIMG WILL BE HELD AT 17:00 TODAY.
[ROBOT'S VOICE] COULD YOU MAKE TIME TO ATTEND THE MEETING?
[ALIEN'S VOICE] PLEASE GIVE ME A RING IF YOU HAVE NO TIME.
SEE YOU LATER.

CHARACTER SETTING INFORMATION : [WOMAN'S VOICE],
[ROBOT'S VOICE], [ALIEN'S VOICE]

\<DETAILED CHARACTER SETTING INFORMATION STORING WORK PORTION\>

| WOMAN'S VOICE | FEMALE VOICE, HEIGHT 1, DEEPNESS 3, SPEED 2, ··· |
|---|---|
| ROBOT'S VOICE | MALE VOICE, HEIGHT 3, DEEPNESS 2, SPEED 1, ··· |
| ALIEN'S VOICE | FEMALE VOICE, HEIGHT 5, DEEPNESS 1, SPEED 3, ··· |

TRANSMITTING
THE MAIL
↓

\<TRANSMITTED MAIL TEXT DATA\>

[WOMAN'S VOICE] A SUDDEN MEETIMG WILL BE HELD AT 17:00 TODAY.
[ROBOT'S VOICE] COULD YOU MAKE TIME TO ATTEND THE MEETING?
[ALIEN'S VOICE] PLEASE GIVE ME A RING IF YOU HAVE NO TIME.
SEE YOU LATER.

[#WOMAN'S VOICE] [FEMALE][HEIGHT 1][DEEPNESS 3][SPEED 2]
[#ROBOT'S VOICE] [MALE] [HEIGHT 3] [DEEPNESS 2] [SPEED 1]
[#ALIEN'S VOICE] [FEMALE] [HEIGHT 5] [DEEPNESS 1] [SPEED 3]

FIG. 12

<RECEIVED MAIL TEXT AND DATA>

[WOMAN'S VOICE] A SUDDEN MEETIMG WILL BE HELD AT 17:00 TODAY.
[ROBOT'S VOICE] COULD YOU MAKE TIME TO ATTEND THE MEETING?
[ALIEN'S VOICE] PLEASE GIVE ME A RING IF YOU HAVE NO TIME.
SEE YOU LATER.

[#WOMAN'S VOICE] [FEMALE][HEIGHT 1][DEEPNESS 3][SPEED 2]
[#ROBOT'S VOICE] [MALE] [HEIGHT 3] [DEEPNESS 2] [SPEED 1]
[#ALIEN'S VOICE] [FEMALE] [HEIGHT 5] [DEEPNESS 1] [SPEED 3]

REGISTERING THE RECEIVED MAIL

<MAIL TEXT>

[WOMAN'S VOICE] A SUDDEN MEETIMG WILL BE HELD AT 17:00 TODAY.
[ROBOT'S VOICE] COULD YOU MAKE TIME TO ATTEND THE MEETING?
[ALIEN'S VOICE] PLEASE GIVE ME A RING IF YOU HAVE NO TIME.
SEE YOU LATER.

CHARACTER SETTING INFORMATION : [WOMAN'S VOICE],
[ROBOT'S VOICE], [ALIEN'S VOICE]

<DETAILED CHARACTER SETTING INFORMATION STORING WORK PORTION>

| WOMAN'S VOICE | FEMALE VOICE, HEIGHT 1, DEEPNESS 3, SPEED 2, ··· |
|---|---|
| ROBOT'S VOICE | MALE VOICE, HEIGHT 3, DEEPNESS 2, SPEED 1, ··· |
| ALIEN'S VOICE | FEMALE VOICE, HEIGHT 5, DEEPNESS 1, SPEED 3, ··· |

ELECTRONIC MAIL DEVICE AND SYSTEM

BACKGROUND OF THE INVENTION

The present invention relates to an electronic device having vocally reproducing and synthesizing function, which is capable of receiving and transmitting externally inputted text data by means of electronic mail and communication facilities.

For example, Japanese Patent Publication No. 4-17504 discloses a technique of reading aloud an electronic mail text, which enables electronic mail devices to vocally reproduce an electronic mail text as desired by a user in such a manner that an electronic mail text is read aloud in accordance with detailed setting information (e.g., male/female voice, reading speed and so on) indicated by a specified pattern of letters inserted by the user in the text.

However, this technique requires a user to insert the detailed setting information in each reproducible portion of the mail text. For example, to realize the vocal reproduction of a specified portion of the mail text by some one's voice, the user has to write all detailed information for reading aloud by the designated person (character) by using a specified letter pattern (format) and insert it in a specified position of the text.

The drawback of the prior art is such that the insertion of all detailed setting information for reading aloud of any part of the mail text with particular person's voice makes the mail text contain a large amount of excessive voice setting information and hence be unpleasant to see and difficult to read. In fact, repeated use of the detailed setting information about the same person (character) increases the volume of the mail text.

SUMMARY OF THE INVENTION

An object of the present invention is to provide an electronic mail device that can store detailed character setting information about a specified person who will read aloud the mail text (hereinafter referred to as a character) in a work area separate from a mail text storing area and attach the detailed character setting information to the mail text to be transmitted, thereby minimizing the amount of the character setting information included in the mail text and realizing vocal reproduction of the text by the designated character's voice. Thus, the device can faithfully give the receiver the sender's massage with enhanced impression, pleasure and variety, which effect can not be obtained by text only.

Another object of the present invention is to provide an electronic mail device capable of vocally reproducing an electronic mail text, comprising: a communication unit for sending and receiving an electronic mail; a memory for storing an electronic mail text and data including character setting information; an input portion for inputting letters; a display portion for displaying letters and images; a voice synthesis control portion for controlling voice synthesis; and a speaker; wherein the mail device in a mode of vocally reproducing a received electronic mail text recognizes character setting information inserted as a text letter string in the mail text, refers to the character setting information and vocally reproduces the mail text by a specified character's voice synthesized based on the character setting information by the voice synthesis control unit.

Another object of the present invention is to provide an electronic mail device wherein the character setting information is defined in detail by detailed character setting information including voice quality such as voice height, voice deepness, vocally reading speed and so on.

Another object of the present invention is to provide an electronic mail device wherein the mail device separates the detailed character setting information from the mail text, stores said information in a detailed character setting information storing portion and, in a stage of having detected a text letter string of character setting information in the mail text, reads the detailed character setting information from the storing portion and vocally reproduces the mail text based on the detailed character setting information.

Another object of the present invention is to provide an electronic mail device which is capable of transmitting and receiving an electronic mail including the character setting information and the detailed character setting information attached to the end or the beginning of the mail text in a predetermined format.

Another object of the present invention is to provide an electronic mail device wherein, in case of having receiving the detailed character setting information attached to the mail text in the predetermined format, the mail device separates the detailed character setting information from the mail text, stores it in a detailed character setting information storing portion and, in a stage of having detected a text letter string of character setting information in the mail text, reads the detailed character setting information from the storing portion and vocally reproduces the mail text based on the detailed character setting information.

Another object of the present invention is to provide an electronic mail device having a communication unit for sending and receiving an electronic mail and a voice synthesis control portion for controlling voice synthesis, wherein the mail device comprising: inserting function for inserting character setting information, which specify a character at the time of vocally reproducing the mail text, as a text letter string in the mail text; and reading out function for connecting with a server sharing the character setting information as shared (common) data, referring to the character setting information corresponding to the text letter string inserted in the mail text and reading out the electronic mail in the character voice synthesized in the voice synthesis control portion based on the referred character setting information.

Another object of the present invention is to provide an electronic mail device wherein the character setting information is defined in detail by detailed character setting information including voice quality such as voice height, voice deepness, vocally reading speed and so on.

Another object of the present invention is to provide an electronic mail device wherein the mail device separates the detailed character setting information from the mail text, stores said information in a detailed character setting information storing portion and, in a stage of having detected a text letter string of character setting information in the mail text, reads the detailed character setting information from the storing portion and vocally reproduces the mail text based on the detailed character setting information.

Another object of the present invention is to provide an electronic mail device which is capable of transmitting and receiving an electronic mail including the character setting information and the detailed character setting information attached to the end or the beginning of the mail text in a predetermined format.

Another object of the present invention is to provide an electronic mail device wherein, in case of having receiving the detailed character setting information attached to the mail text in the predetermined format, the mail device separates the detailed character setting information from the mail text, stores it in a detailed character setting information storing portion and, in a stage of having detected a text letter string of character setting information in the mail text, reads the detailed character setting information from the storing portion and vocally reproduces the mail text based on the detailed character setting information.

Another object of the present invention is to provide an electronic mail system having: an electronic mail device including a communication unit for sending and receiving an electronic mail and voice synthesis control portion for controlling voice synthesis; and a server for sharing the character setting information, which specify a character at the time of vocally reproducing the mail text, as shared (common) data, wherein the mail device comprising: inserting function for inserting character setting information, which specify a character at the time of vocally reproducing the mail text, as a text letter string in the mail text; and reading out function for connecting with a server sharing the character setting information as shared (common) data, referring to the character setting information corresponding to the text letter string inserted in the mail text and reading out the electronic mail in the character voice synthesized in the voice synthesis control portion based on the referred character setting information.

BRIEF DESCRIPTION OF THE DRAWINGS

FIG. 8 illustrates an exemplary content stored in a character setting information portion of an electronic mail device according to the present invention.

FIG. 9 illustrates an exemplary content of a mail text and detailed character setting information stored in a detailed information storing work portion of an electronic mail device when performing the step S73 of FIG. 7.

FIG. 11 illustrates an example of a mail text, a content of detailed character setting information stored in a detailed character setting information storing work portion and transmittable mail text data, which has been prepared for transmission by an electronic mail device according to the present invention.

FIG. 12 illustrates an example of an electronic mail text, data and a content of detailed character setting information stored in a detailed character setting information storing work portion, which has been received by an electronic mail device according to the present invention.

PREFERRED EMBODIMENT OF THE INVENTION (The First Embodiment)

Figure 1:
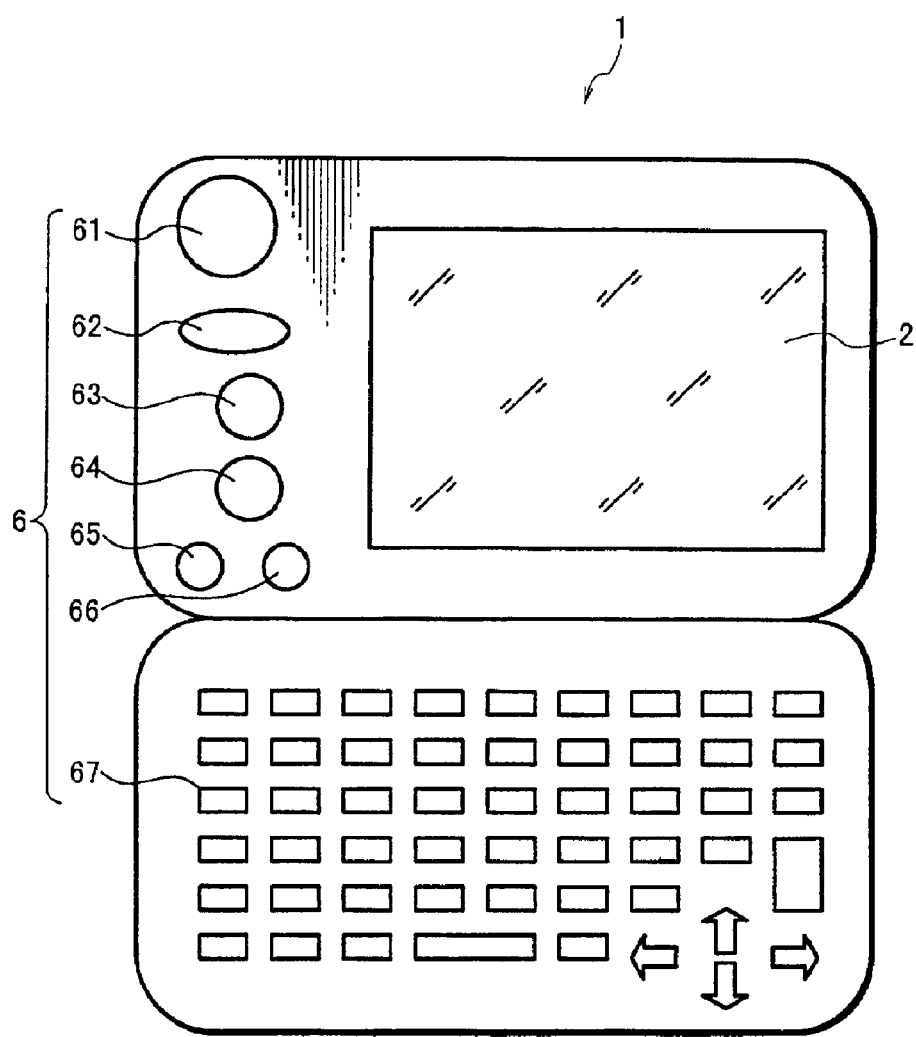
FIG. 1 is a plan view of an electronic mail device according to an embodiment of the present invention.

The first preferred embodiment of the present invention will be described bellow with reference to the accompanying drawings. FIG. 1 is a plan view of an electronic mail device according to an embodiment of the present invention.

The electronic device body 1 has a liquid crystal display portion 2 for displaying messages and images and an input portion 6 comprising a group of various operation keys. The group of keys consisting the input portion 6 includes a power supply key 61 for switching on and off the power source, a mail application key 62, a menu key 63, a voice reproduction start/stop key 64, an OK key 65, a cancel key 66, letter input keys (a keyboard) 67 and so on.

Letters can be entered into the device through input keys composing a keyboard or touch panel. The electronic device 1 incorporates a CPU and memories (ROM and RAM) in its body.

In this description, letters are entered into the electronic device 1 by the group of keys 6 as shown FIG. 1.

The electronic mail application key 62 is used for driving an electronic mail application and the menu key 63 is used for displaying/switching off the menu (a list of available functions) on each image screen.

The OK key 65 and the cancel key 66 are used for executing, recognizing and canceling, respectively, the data input operation or alert information on the display.

The character input operation is described below by way of example by using a keyboard as shown in FIG. 1.

Figure 2:
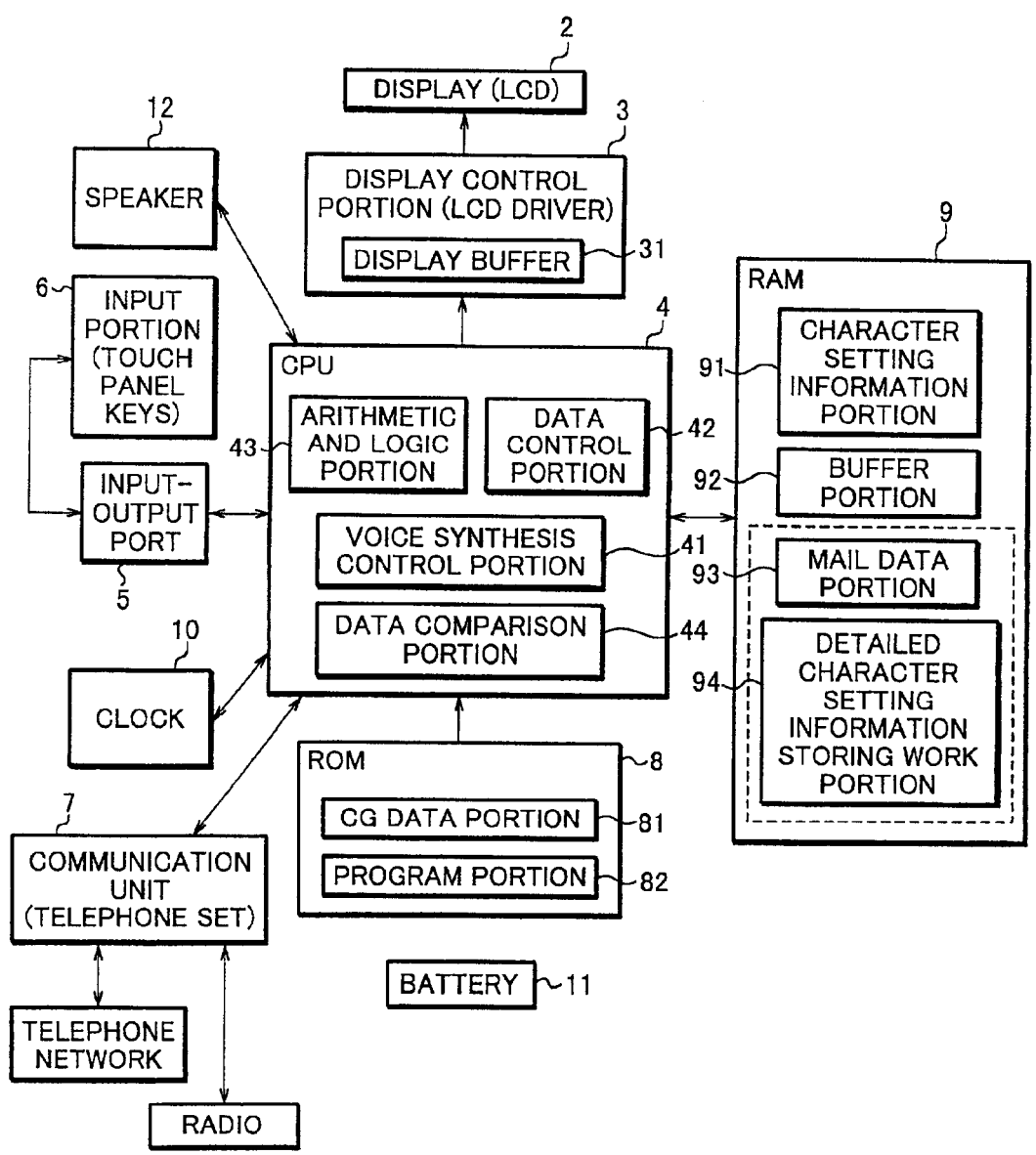
FIG. 2 is a block diagram of a hardware construction of an electronic mail device according to the present invention.

FIG. 2 is a block diagram of a hardware structure of an electronic mail device according to the present invention. The components identical to those shown in FIG. 1 are given the same numerals. In the shown device, the CPU 4 controls the input/output activities of the device and performs all the arithmetic and logical operations. It includes a voice synthesis control portion 41, a control portion 42 and an arithmetic and logic portion 43 and a data comparison portion 44.

The voice synthesis control portion 41 controls the synthesis and reproduction of voice signals. The synthesized/reproduced voice by control of the voice synthesis control portion 41 is output through the speaker 12 when the vocal reproduction start/stop key 64 was pressed.

The display portion 2 is, for example, a dot-matrix type liquid crystal display unit (hereinafter referred to as LCD), which displays on its screen a result of arithmetic and logic operation and a message etc. when display data is written in a display buffer 31 of the display control portion 3 (hereinafter referred to as LCD driver) based on a control signal from the CPU 4.

Data input by the input portion 6 is transferred via an input port 5 to the CPU 4 that in turn processes the input data and recognizes which function key was pushed.

A communication unit 7 is used for transmitting and receiving data to and from the other party over a telephone network and by radio.

The electronic mail devices further may include clock 10.

The read only memory ROM 8 has a program storage portion 82 for storing programs to realize various functions of the device body 1 and mail reciting facility according to the present invention and a CG data storage portion 81 for storing a letter font usable for displaying letters.

A data comparison portion 44 of the CPU 4 is used for comparing data to one another in the ROM 8.

The random access memory RAM 9 comprising a character setting information portion 91 for storing a character setting information about voice synthesis, a buffer 92, a mail data portion 93 and a detailed character setting information storing work portion 94 for storing detailed character setting information. The RAM 9 stores a variety of data in the corresponding portions.

A battery cell 11 is a power source of the device.

The RAM 9 is backed up by the battery cell 11 not to loose data contained in the character setting information portion 91, mail data portion 93 and the detailed character setting information storing work portion 94 thereof in the event of power switched OFF.

Figure 3:
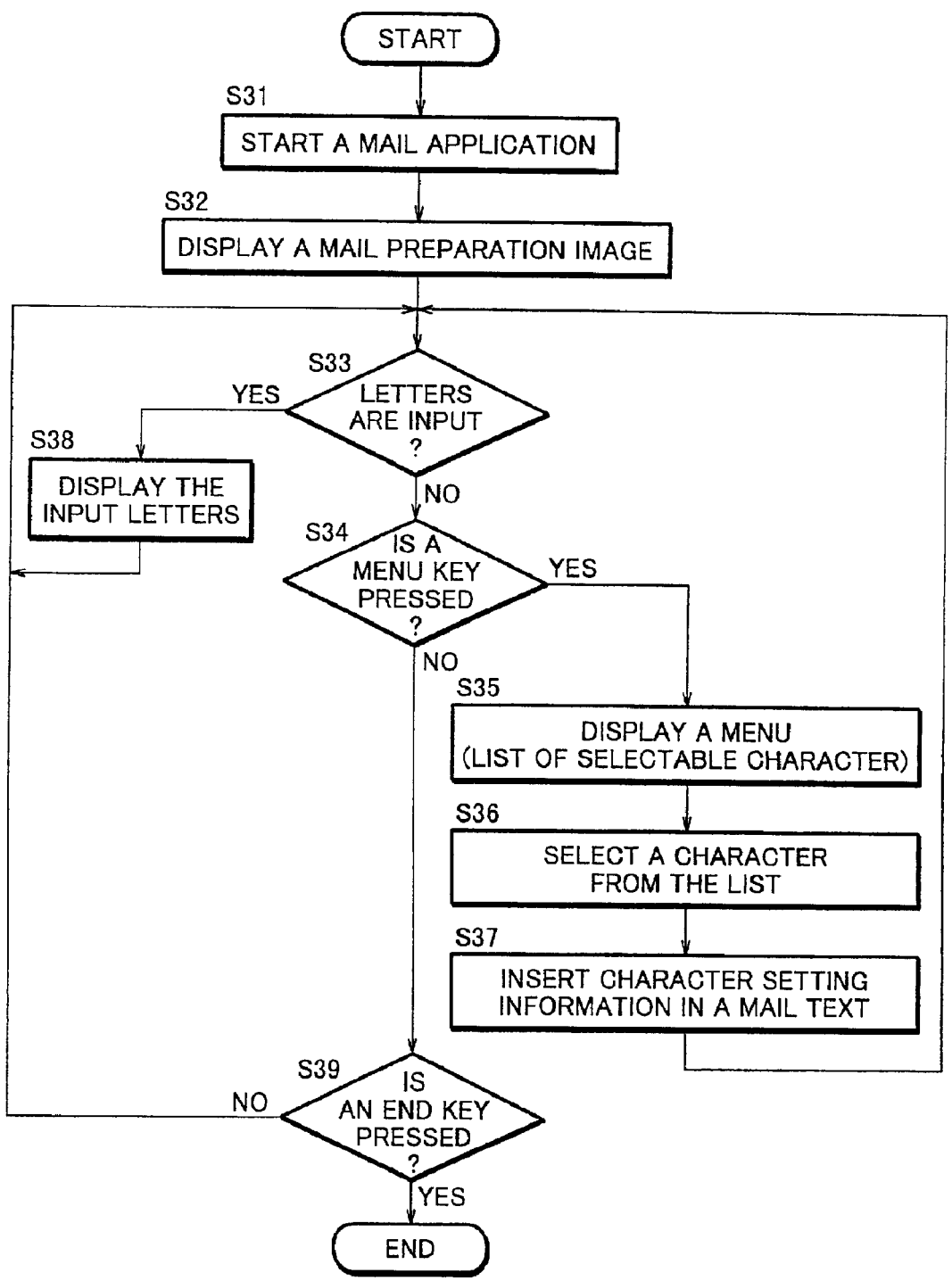
FIG. 3 is a flowchart depicting a procedure for preparing a vocally reproducible text of an electronic mail by an electronic mail device according to the present invention.

FIG. 3 is a flowchart depicting the procedure for preparing an electronic mail text by an electronic mail device according to the present invention.

Figure 4:
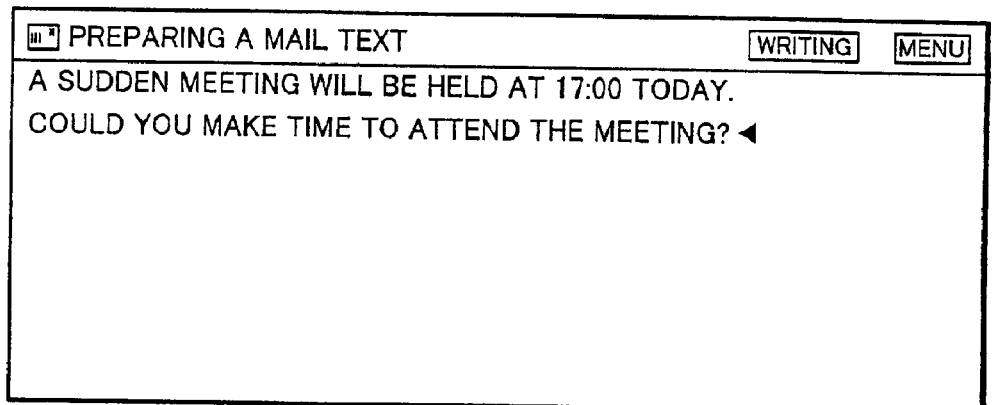
FIG. 4 illustrates an exemplary layout of a text prepared on a screen image for preparing an electronic mail text by the electronic mail device according to the present invention.

The electronic mail application key 62 (see FIG. 1) of the input portion 6 is first pressed to activate the electronic mail application (Step S31) for presenting an image for preparation of the electronic mail text (Step S32). FIG. 4 shows an exemplary layout of an image for preparation of an electronic mail text.

In the state waiting for input data, the device examines whether a letter was input (Step S33) or not. If so, the device displays the input letter on an image of a text input editor 21 (see FIG. 4) (Step S38) and returns to the waiting state again. The device repeatedly returns to the waiting state until the mail application end is recognized by pressing the OK key 65 or the cancel key 66 (in the group of keys of the input device 6 of FIG. 1) (Step S39).

When the menu key 63 for displaying a menu (of a list of selectable character) was pressed in the waiting state of the device (Step S34), the menu (a list of selectable character) is presented on the screen (Step S35).

Figure 5:
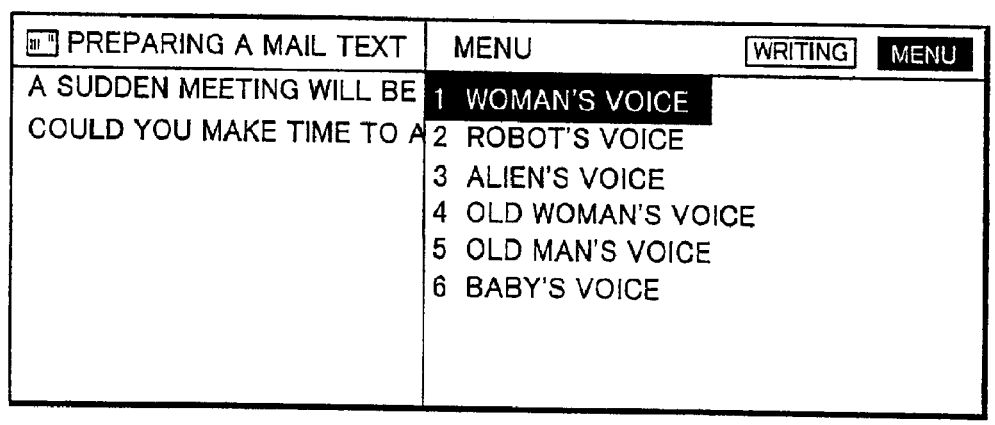
FIG. 5 illustrates an exemplary layout image of a menu (a list of selectable character settings) presented by an electronic mail device according to the present invention.

FIG. 5 shows an exemplary image of a menu presenting a list of selectable character in an electronic mail device according to the present invention.

The user selects (sets) any one of characters from the menu by using the input key group 6 (Step S36). The inputted character setting information is presented as a specified text letter string (or a pictorial symbol or icon) on the screen image of the text input editor 21 as shown in FIG. 4 (Step S37).

Figure 6:
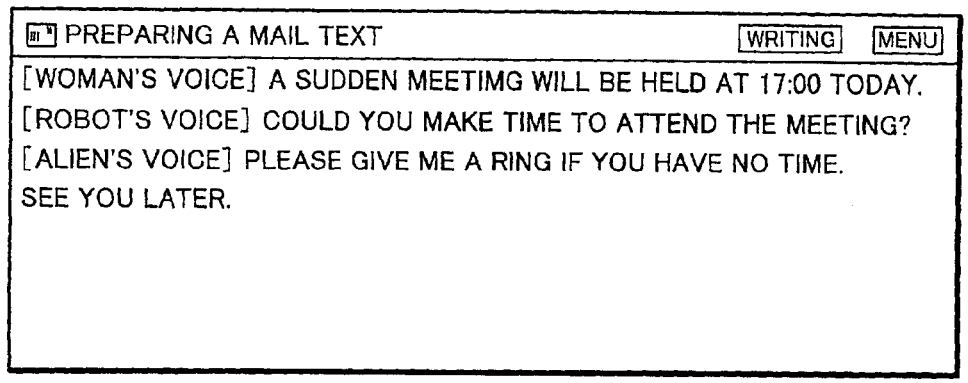
FIG. 6 illustrates an image of an electronic mail text (FIG. 4) with text letter strings of the character setting information inserted therein.

FIG. 6 illustrates an image of the electronic mail text (FIG. 4) with insertion of text letter strings of character setting information selected by the user. In FIG. 6, text letter strings of the character setting information are indicated in square brackets.

The electronic mail text with insertion of text letter strings of the character setting information may be received and visually read with no trouble even if it is transmitted through Internet to a receiving terminal lacking in ability of vocally reproducing the mail text. In this case, receiver can view the mail text and text letter strings of the character setting information selected by sender with imagination of how the text could be read aloud by the specified voice.

Figure 7:
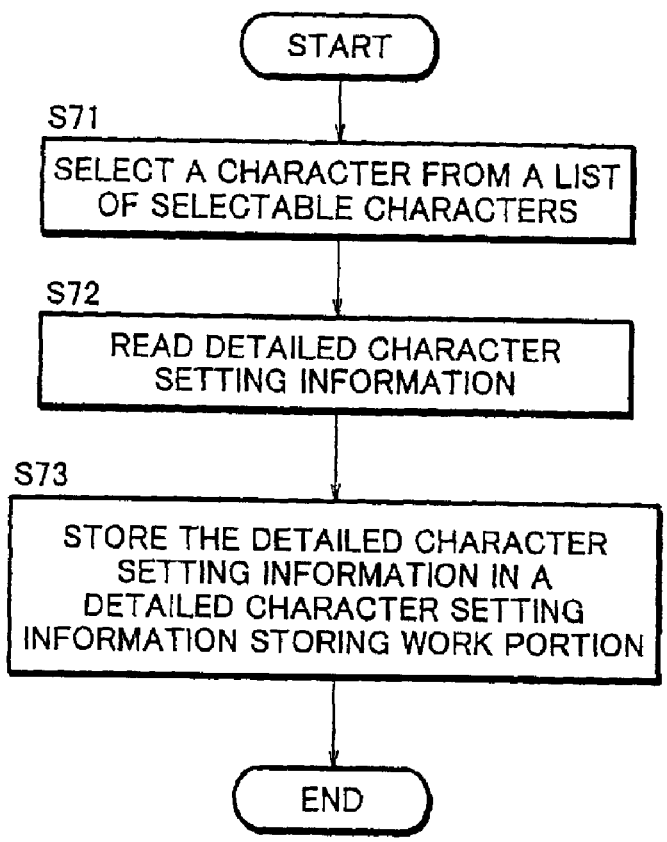
FIG. 7 is a flowchart depicting a procedure for storing detailed character setting information in a detailed information storing work portion of an electronic mail device according to the present invention.

Detailed setting information relating the quality of voice (e.g. voice height, deepness, speed) of a character, which information (hereinafter referred to as detailed character setting information) was selected and inputted by the user together with the character setting information inserted in the mail text, can be stored in a work portion provided specially for storing detailed character setting information according to the following method:

FIG. 7 is a flowchart depicting a procedure of storing detailed character setting information in the detailed character setting information storing work portion in an electronic mail device according to the present invention.

A desired character indicated in the selectable character list is selected first by using the key group 6 (Step S71 in FIG. 7 and Step S36 in FIG. 3).

Detailed information about each selected character setting is read from the character setting information portion 91 of the random-access memory RAM 9 (see FIG. 2) (Step S72) and stored in the work portion 94 of the same memory (Step S73).

FIG. 8 illustrates an exemplary content of character setting information portion 91 of the RAM 9 of an electronic mail device according to the present invention.

Detailed character setting information such as "voice height", "deepness" and "speed" for each designated character setting, which are stored in the character setting information portion 91 of the RAM 9, is read out and stored in the detailed character setting information storing work portion 94 of the RAM 9.

FIG. 9 illustrates an example of a mail text and data stored in the detailed character setting information storing work portion in the process of performing Step S73 (FIG. 7) by the electronic mail device according to the present invention.

As shown in FIG. 9, the inserted character setting information, for example, [female voice], [robot voice] and [alien voice] are put at specified positions, respectively, in the mail text.

To vocally reproduce the thus prepared mail text presented on the display screen, the device recognizes the character setting information inserted in the mail text, reads the detailed character setting information (e.g., voice height, deepness, speed and so on) from the detailed character setting information on storing work portion of the memory according to the recognized character setting information and reproduces by reading aloud the specified portion of the text by the specified voice based on the detailed information.

Figure 10:
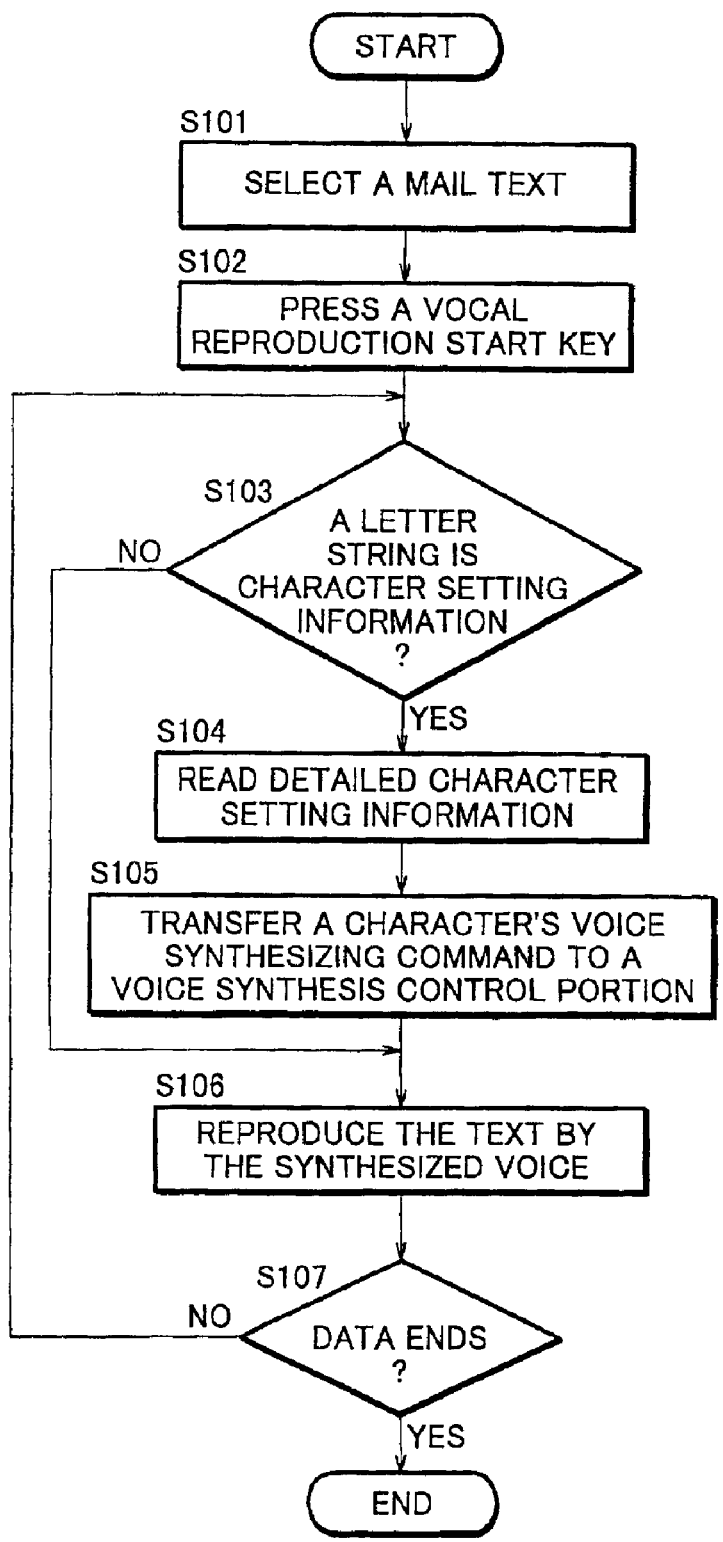
FIG. 10 is a flowchart depicting a procedure for vocally reproducing a content of a received electronic mail by an electronic mail device according to the present invention.

FIG. 10 is a flowchart depicting a procedure of vocally reproducing a received electronic mail by an electronic mail device according to the present invention.

The electronic mail text to be reproduced by synthesized voice is first selected (Step S101) and the voice reproduction start key 64 (FIG. 1) is pressed (Step 8102). The electronic mail device searches the character setting information inserted in the mail text (Step S103) and, if no information is found, directly performs vocal reproduction of the mail text (Step S106). With the character setting information detected in the mail text, the electronic mail device reads the detailed character setting information from the detailed character information storing work portion 94 of the RAM 9 (Step S104), and transfers the command indicating the detailed setting such as voice height, deepness and speed, etc. to the voice synthesis control portion 41 (see FIG. 2) (Step S105). The control portion 41 changes the reciting voice from the normal to the specified voice of the designated character (person) and then reproduces the specified portion of the mail text by the specified character's voice via the speaker 12 (Step S106). If there is additional data to be processed, processing returns to Step S103. If all data is processed, processing ends (Step S107).

When transmitting the prepared mail text, detailed character setting information stored in the work portion 94 and character setting information are edited in a given format of a text character string (pictorial symbol and so on) and automatically attached to the end (or the beginning) of the mail text.

FIG. 11 illustrates an exemplary content of a mail text, detailed character setting information stored in the work portion 94 and mail text data to be transmitted.

Now, it is assumed that the detailed character setting information (e.g., voice height, deepness and speed) in a format with square brackets [ ] and the character setting information in a format [#character's name] are attached to the end of the mail text to be transmitted to a remote party.

When the thus prepared mail text was received by an electronic mail device according to the present invention, the detailed character setting information may be added to the end (or the head) of the mail text and stored in the work portion of the RAM of the device.

FIG. 12 illustrates an exemplary content of a received mail text data, mail text and the data stored in the work portion of an electronic mail device according to the present invention.

Now, it is also assumed that the received mail text is followed by the detailed character setting information (e.g., voice height, deepness and speed) in the format enclosed in square brackets and a character setting information in a format [#character's name].

Since the detailed character setting information attached to the end of the mail text is separated from the mail text and registered in the memory of the device, it may be prevented from being indicated in the mail text to be displayed on the screen by the application.

This makes the mail text be easier to read with no indication of the detailed character setting information.
(The Second Embodiment)

The second preferred embodiment of the present invention would function by the electronic device as shown in FIG. 1 like the first preferred embodiment and explanation of a repetition of the function of the electric device is omitted.

Figure 13:
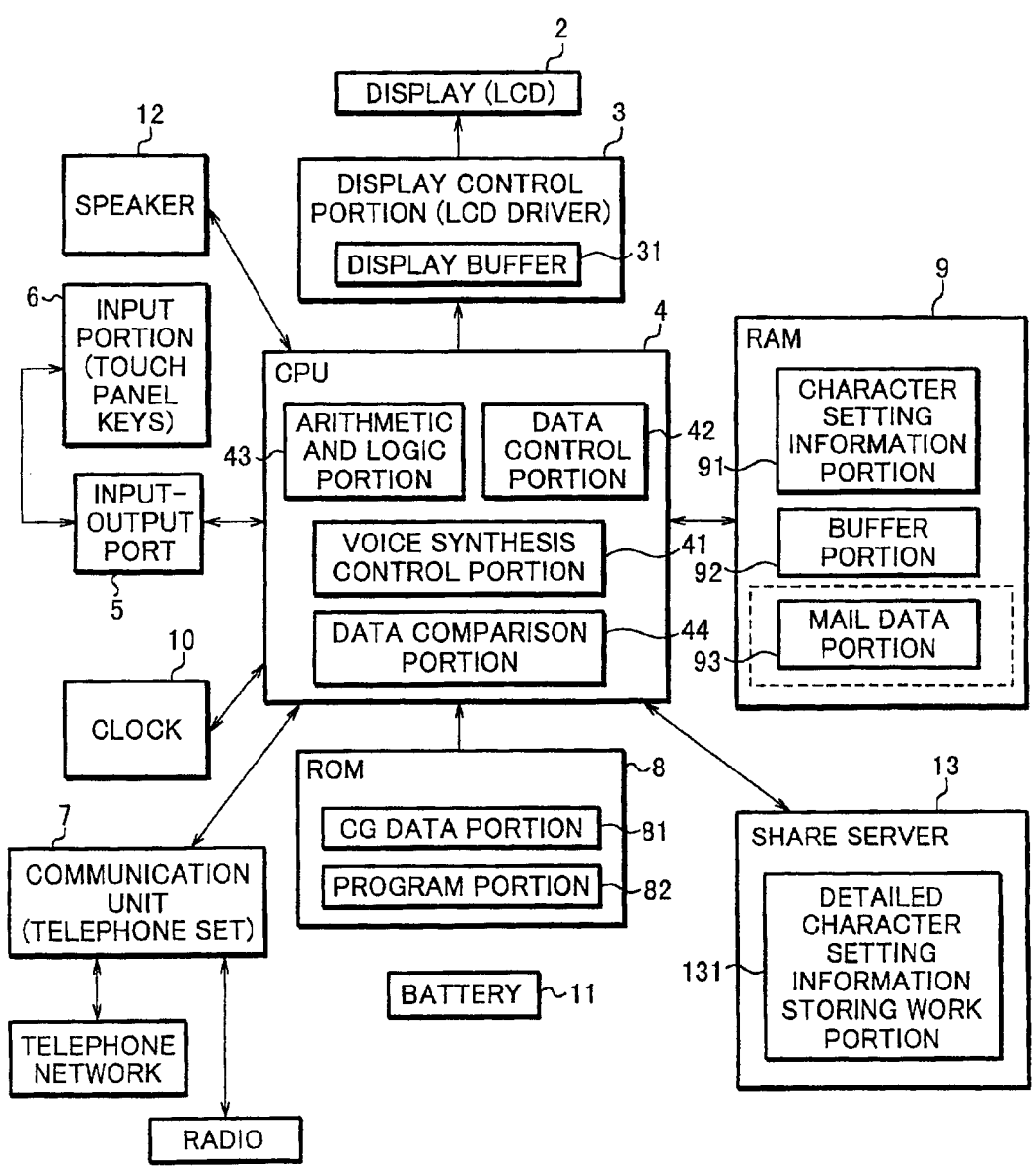
FIG. 13 illustrates a block diagram of a electronic device and a share server according to the present invention.

FIG. 13 is a block diagram of a hardware construction of an electronic mail device and a share server according to the present invention. In the shown device, the numeral 13 depicts a share server and the numeral 131 depicts a detailed character setting information storing work portion. The components having the same function as an electronic device as shown in FIG. 2 are given the same numerals to omit explanation of the repetition. The share server 13, which is referred to from each terminal, stores detailed character setting information data of mail which is read out in the work portion 131. That is, the second embodiment is understood that the detailed character setting work portion 94 set on the RAM 9 in the composition of the first embodiment as shown in FIG. 2 is allotted to the share server 13 which can be connected by the electronic device terminal.

Figure 14:
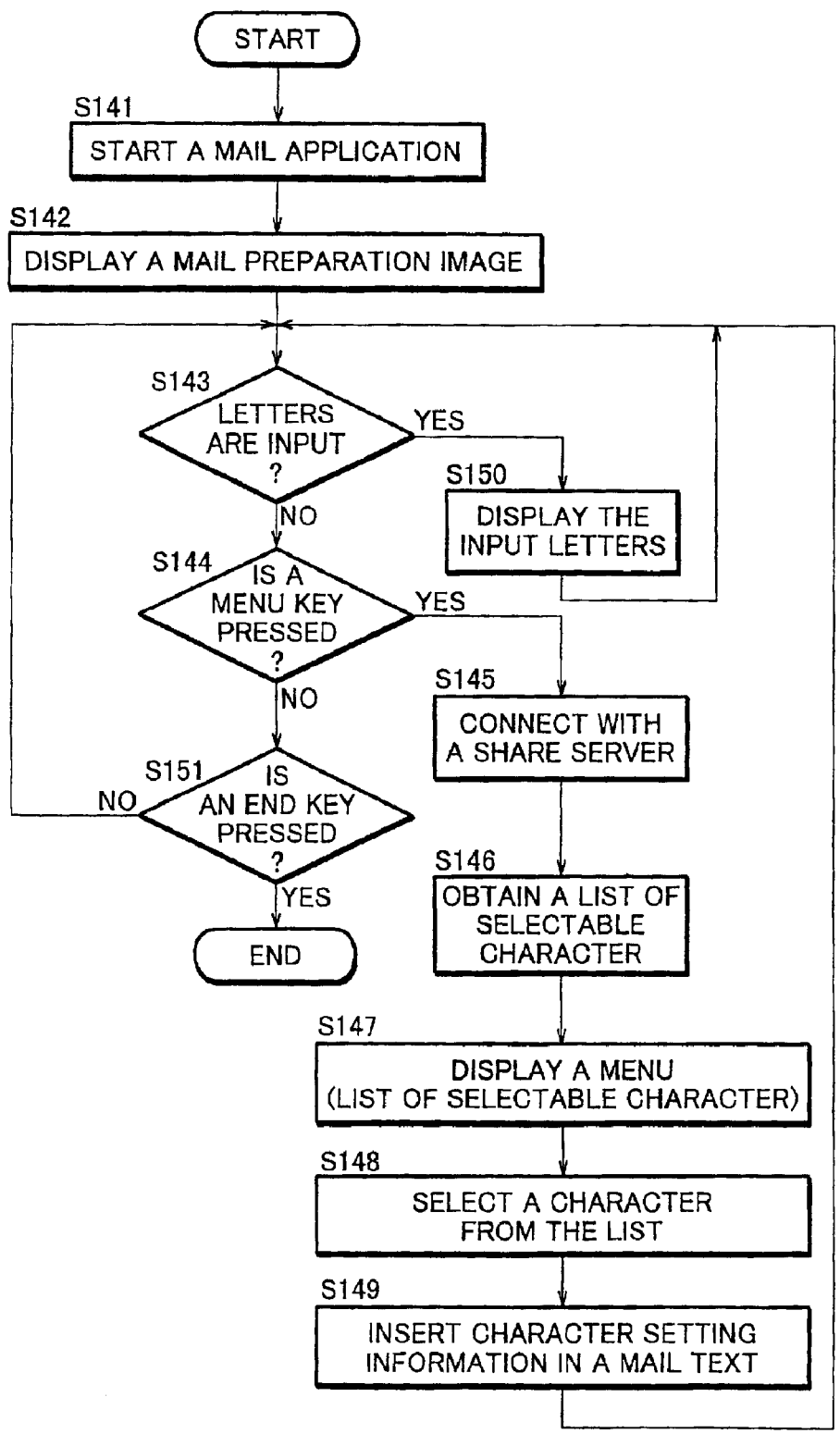
FIG. 14 illustrates a flowchart depicting a procedure for inserting the detailed character setting information in a mail text in a particular format like picture sign, creating and displaying the mail text.

FIG. 14 is a flowchart depicting the procedure for preparing an electronic mail text, inserting the character setting information for voice synthesis at the time of mail text creation into the mail text in given letter sequences (picture sign etc.) and displaying the mail text. The electronic mail application key 62 (see FIG. 1) of the input portion 6 is first pressed to activate the electronic mail application (Step S141) for presenting an image for preparation of the electronic mail text as shown in FIG. 4 (Step S142).

In the state waiting for input data, the device examines whether a letter was input (Step S143) or not. If so, the device displays the input letter on an image of a text input editor 21 (see FIG. 4) (Step S150) and returns to the waiting state again. The device repeatedly returns to the waiting state until the mail application end is recognized by pressing the OK key 65 or the cancel key 66 (in the group of keys of the input device 6 of FIG. 1)(Step S151).

When the menu key 63 for displaying menu (of a list of selectable characters) is pressed in the waiting state of the device (Step S144), connection with the share server 13 is operated (Step S145), the menu contained in the server is obtained (Step S146) and the obtained menu is presented on the screen (see FIG. 5) (Step S147). The user selects any one of characters from the menu by using the input key group 6 (Step S148). The inputted character setting information is presented as a given text letter sequences (or a pictorial symbol or icon) on the screen image of the text input editor 21 as shown in FIG. 4 (Step S149). FIG. 6 illustrates an image of the electronic mail text with insertion of the text letter sequences of the detailed character setting information.

Although the invention has been described in the above-mentioned preferred embodiments with a certain degree of particularity, it is understood that the present disclosure of the preferred embodiments has been changed in the details of construction and the combination and the arrangement of parts may be restored to without departing from the spirit and the scope of the invention as hereinafter claimed.

As apparent from the foregoing, an electronic mail device according to the present invention provides the following advantages:

The device enables a mail sender to designate a character for any phrase of a mail text by inserting a text letter string therein to vocally reproduce the specified phrase by the specified reciting voice, expressing the feeling, pleasure and variety, which can not be transmitted to a receiver by sentences only.

Thus, prepared electronic mail can express sender's message with enhanced impression, pleasure and variety of vocal reproduction of the electronic mail text, which can not be achieved by the electronic mail text only.

On the other hand, an electronic mail system according to the present invention enables a mail receiver to hear with reality an electronic mail text vocally reproduced by the specified character's voice that may express the sender's mind.

The electronic mail system according to the present invention inserts in a mail text only information identifying a character who will read aloud a specified phrase or sentence of a mail text (the character setting information), separately stores detailed character setting information (e.g., voice height, voice deepness and vocally reading speed) in a detailed character setting information storing work portion and vocally reproduces the specified portions of the mail text by respectively specified character's voices with reference to the detailed character setting information stored in the detailed character setting information storing work portion. This can minimize the character-related information inserted in the mail text, thus making the mail text be easier to read.

When transmitting and receiving the electronic mail prepared by the above method, the detailed character setting information prepared in a specified format is attached to the end or beginning of the transmittable mail text and can be separated from the received mail text and separately stored in a detailed character setting information storing work portion. Thus the mail text is vocally reproduced based on the detailed character setting information stored in the work portion, enabling the receiver to correctly reproduce the specified portions of the text by specified reciting voices respectively.

The detailed character setting data can be automatically attached to the end of a transmittable mail text and separated from there, thus enabling the user to easily transmit and receive the electronic mail with no need for recognizing attachment or separation of the detailed character-related data.

What is claimed is:

1. An electronic mail device capable of vocally reproducing an electronic mail text, comprising:
   a communication unit for sending and receiving an electronic mail;
   a memory for storing data including electronic mail text, character setting information, and detailed character setting information;
   an input portion for inputting data;
   a display portion for displaying letters and images;
   a voice synthesis control portion for controlling voice synthesis; and
   a speaker;
   wherein the electronic mail device in a mode of vocally reproducing a received electronic mail text recognizes character setting information inserted as a text letter string in the mail text, refers to the character setting information and the detailed character setting information and vocally reproduces the mail text by a specified character's voice synthesized based on the character setting information and the detailed character setting information by the voice synthesis control unit, and wherein the character setting information and the detailed character setting information are not appended to each other.

2. An electronic mail device as defined in claim 1, wherein the character setting information is defined in detail by detailed character setting information representing voice quality including at least one of voice height, voice deepness, and vocal reading speed.

3. An electronic mail device as defined in claim 2, wherein the electronic mail device separates the detailed character setting information from the mail text, stores said information in a detailed character setting information storing portion and, in a stage of having detected a text letter string of character setting information in the mail text, reads the detailed character setting information from the storing portion and vocally reproduces the mail text based on the detailed character setting information.

4. An electronic mail device as defined in claim 2, which is capable of transmitting and receiving an electronic mail including the character setting information and the detailed character setting information attached to the end or the beginning of the mail text in a predetermined format.

5. An electronic mail device as defined in claim 4, wherein, in case of having receiving the detailed character setting information attached to the mail text in the predetermined format, the mail device separates the detailed character setting information from the mail text, stores it in a detailed character setting information storing portion and, in a stage of having detected a text letter string of character setting information in the mail text, reads the detailed character setting information from the storing portion and vocally reproduces the mail text based on the detailed character setting information.

6. An electronic mail device having a communication unit for sending and receiving an electronic mail and a voice synthesis control portion for controlling voice synthesis, wherein the mail device comprising:
   inserting function for inserting character setting information, which specify a character at the time of vocally reproducing mail text, as a text letter string in the mail text and detailed character setting information; and
   reading out function for connecting with a server sharing the character setting information as shared data, referring to the character setting information corresponding to the text letter string inserted in the mail text and detailed character setting information located separate from the character setting information in the electronic mail, and reading out the electronic mail in the character voice synthesized in the voice synthesis control portion based on the referred character setting information, and detailed character setting information.

7. An electronic mail device as defined in claim 6, wherein the character setting information is defined in detail by detailed character setting information representing voice quality including at least one of voice height, voice deepness, and vocal reading speed.

8. An electronic mail device as defined in claim 7, wherein the electronic mail device separates the detailed character setting information from the mail text, stores said information in a detailed character setting information storing portion and, in a stage of having detected a text letter string of character setting information in the mail text, reads the detailed character setting information from the storing portion and vocally reproduces the mail text based on the detailed character setting information.

9. An electronic mail device as defined in claim 7, which is capable of transmitting and receiving an electronic mail including the character setting information and the detailed character setting information attached to the end or the beginning of the mail text in a predetermined format.

10. An electronic mail device as defined in claim 9, wherein, in case of having received the detailed character setting information attached to the mail text in the predetermined format, the electronic mail device separates the detailed character setting information from the mail text, stores it in a detailed character setting information storing portion and, in a stage of having detected a text letter string of character setting information in the mail text, reads the detailed character setting information from the storing portion and vocally reproduces the mail text based on the detailed character setting information.

11. An electronic mail system having: an electronic mail device including a communication unit for sending and receiving an electronic mail and voice synthesis control portion for controlling voice synthesis; and
   a server for sharing the character setting information, which specify a character at the time of vocally reproducing the mail text, as shared data, wherein the mail device comprising:
   inserting function for inserting character setting information, which specify a character at the time of vocally reproducing the mail text, as a text letter string in the mail text and detailed character setting information; and
   reading out function for connecting with a server sharing the character setting information as shared data, referring to the character setting information corresponding to the text letter string inserted in the mail text and detailed character setting information located separate from the character setting information in the electronic mail and reading out the electronic mail in the character voice synthesized in the voice synthesis control portion based on the referred character setting information and the detailed character setting information.

* * * * *